M. EDEL.
RAKE WITH EXCHANGEABLE PRONGS.
APPLICATION FILED JAN. 6, 1921.
1,385,965. Patented July 26, 1921.
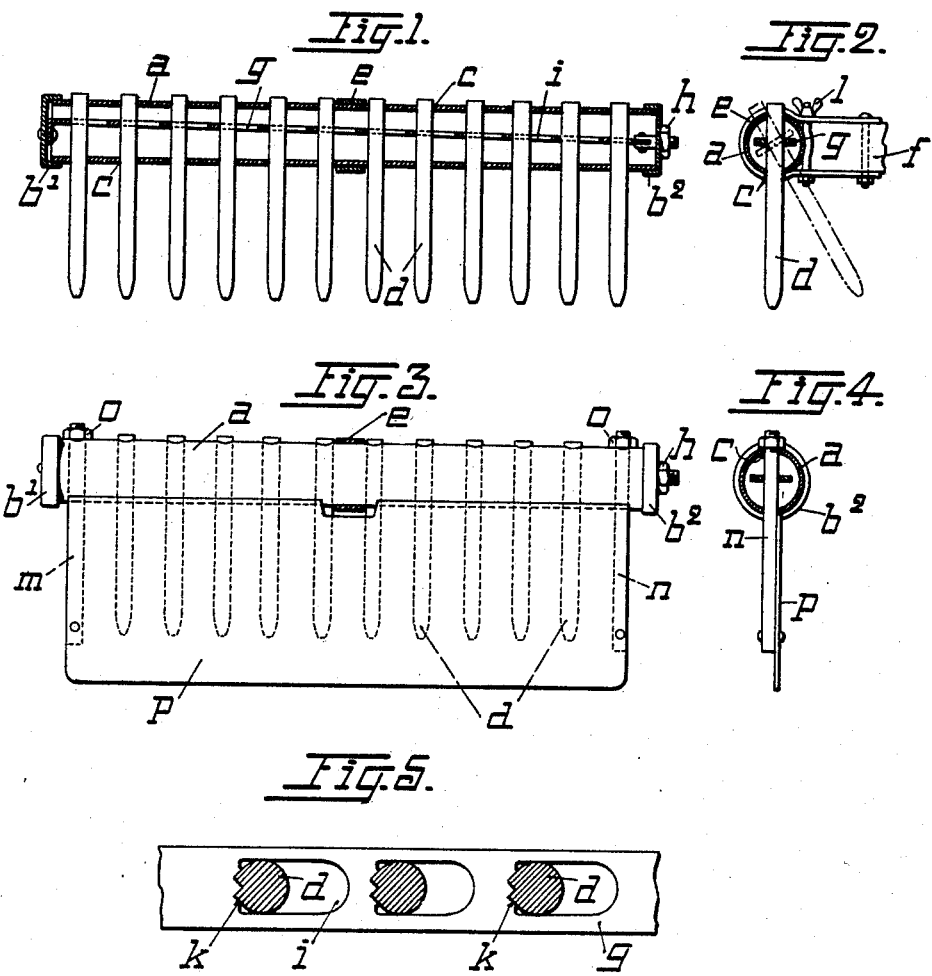

UNITED STATES PATENT OFFICE.

MAX EDEL, OF NUREMBERG, GERMANY, ASSIGNOR TO THE FIRM OF MASCHINEN-FABRIK WORZELDORF H. A. PAULUS & FRANCK, OF WORZELDORF-NUREMBERG, GERMANY.

RAKE WITH EXCHANGEABLE PRONGS.

1,385,965. Specification of Letters Patent. Patented July 26, 1921.

Application filed January 6, 1921. Serial No. 435,528.

*To all whom it may concern:*

Be it known that I, MAX EDEL, a citizen of the German Republic, and resident of Nuremberg, Germany, have invented a certain new and useful Improved Rake with Exchangeable Prongs, (for which I have filed an application in Germany, September 27, 1919,) of which the following is a specification.

This invention relates in general to a rake with exchangeable prongs or spikes, and in particular to means for fastening the prongs or spikes in the rake-head. These means consist chiefly of a metal-strip or steel-band located in a hollow rake-head and having oblong apertures through which the heads of the prongs or spikes extend and in which they, that is to say, the whole prongs or spikes, are securely held in place by means of sharp edges or pointed projections which are provided at the short sides of the aperture-edges and are drawn against and into the respective sides of the prongs or prong-heads by a longitudinal motion of said metal-band. This consists preferably of steel and is stretched out between the frontal closing caps of the hollow rake-head, and means are provided to put the steel-band under tension so as to pull the sharpened edges or the pointed projections of the operating aperture-edges against the prong- or spike-heads, as already mentioned.

The rake-head is connected with the rake-handle by a clamp or clip in which it may be rotated and then secured in position so that the prongs or spikes may have any desired position with respect to the handle; that is to say, they need not extend at right angles to the handle, but may form any other angle with it, as just most appropriate for the special material to be handled.

Another feature resides in this that the rake may be changed into another implement, especially a spade or shovel, by means of two rods or bars which may be put through the rake-head parallel to the prongs or spikes and are connected by, and with, a piece of sheet-metal adapted to be employed like the operating part of a spade or shovel.

In order to make my invention more clear, I refer to the accompanying drawing, in which similar letters denote similar parts throughout the several views, and in which:

Figure 1 is a longitudinal vertical section through the head of a rake constructed according to my invention; the prongs or spikes being shown in front-view;

Fig. 2 is a vertical transverse section through the rake-head, showing also the adjacent part of the handle and the connecting clip or clamp;

Fig. 3 is an illustration similar to Fig. 1 showing the rake turned into a spade or shovel;

Fig. 4 is an illustration similar to Fig. 2, showing a transverse section through the form of execution shown in Fig. 4; and Fig. 5 is a plan of a piece of the steel-band with its oblong apertures, in connection with some of the prongs or spikes which are shown in section.

The rake-head consists of a tube $a$ which is closed at its ends by caps $b^1$ $b^2$ and has two series of holes $c$ along its length. These holes receive the heads of the prongs or spikes $d$, and the caps $b^1$ $b^2$ hold the steel-band $g$. One end of the band is secured to the cap $b^1$ and the other is provided with a bolt which passes through a hole of the cap $b^2$ and bears a nut $h$ which is screwed home against that cap whereby the steel-band is stretched. Each of the oblong apertures $i$ of the steel-band $g$ is at one of its short edges sharpened, or provided with pointed teeth $k$, as shown, and the stretching means of and for the band serve for forcing the sharpened edges, or the teeth $k$ respectively, against and partly into the prongs or spikes, as shown in Fig. 5, whereby the prongs or spikes are firmly held in their respective places in the rake-head $a$.

$e$ is the clip or clamp by which the head $a$ is connected with the handle $f$. The clip or clamp embraces the head $a$ and these parts may be firmly clamped together by a bolt and a winged nut $l$ (Fig. 2). When this nut is loosened, the rake-head $a$ may be turned in the clip or clamp whereby the position of the prongs or spikes relatively to the handle may be changed, as indicated in dotted lines by way of example in Fig. 2. Then when the nut $l$ is screwed home, the rake-head with its prongs or spikes is fastened in the other position.

In the form of construction shown in Figs. 3 and 4 the two end-prongs or spikes are removed, and replaced by bars or rods $m$ $n$ which are riveted to a metal-plate $p$. The bars or rods $m$ $n$ are held in place by nuts $o$ and the metal-plate $p$ is supported by the remaining prongs or spikes so that it may consist of thin sheet-metal, as shown in Fig. 4. It is, however, not necessary that all prongs or spikes between the bars or rods $m$ $n$ remain in their places in the rake-head $a$. This depends upon the material to be manipulated by the plate $p$. If it is a material of low weight, also every third or even every second prong or spike may be removed from the rake-head.

Disconnecting the prongs or spikes from the rake-head is effected by unscrewing the nut $h$ when the steel-band $g$ will lose its tension, or will become slack respectively. The prongs or spikes may then be easily drawn out of the holes $c$ of the rake-head $a$. Inserting and fastening the prongs or spikes is effected, of course, by the reverse order of manipulations.

Having now described my invention, what I desire to secure by patent of the United States is:

1. A rake, comprising, in combination, a hollow rake-head, a metal-band having oblong apertures extending through said head in its longitudinal direction; holes provided in the rake-head wall and registering with said metal-band apertures; prongs passing through said holes and said apertures; and means to put the said metal-band under tension, for the purpose set forth.

2. A rake, comprising, in combination, a hollow rake-head, a steel-band having oblong apertures extending through said head in its longitudinal direction, one of the short sides of each aperture being sharpened; holes provided in the rake-head wall and registering with said steel-band apertures; spikes passing through said holes and said apertures; and means to put the said metal-band under tension, for the purpose set forth.

3. A rake, comprising, in combination, a hollow rake-head, a metal-band having oblong apertures extending through said head in its longitudinal direction; two rows of holes provided in the rake-head upon opposite sides and registering to said metal-band apertures; prongs held in said holes by means of said metal-band; and means to put this latter under tension, for the purpose set forth.

4. A rake, comprising, in combination, a hollow rake-head, a steel-band having oblong apertures extending through said head in its longitudinal direction; pointed projections provided at one of the short sides of each aperture; spikes passing through said holes and said apertures and contacting with said pointed projections; and means to put said steel-band under tension, for the purpose set forth.

5. A rake, comprising, in combination, a hollow rake-head, a metal-band having oblong apertures extending through said head in its longitudinal direction; holes provided in the rake-head wall and registering to said metal-band apertures; prongs passing through said holes and said apertures; caps closing the rake-head ends; a central hole in one of said caps; a connection between the other cap and the adjoining end of the metal-band; a threaded bolt affixed to the other end of the metal-band and extending through said cap-hole; and a nut upon the outer end of said bolt, for the purpose set forth.

6. A rake, comprising, in combination, a hollow rake-head, a metal-band having oblong apertures extending through said head in its longitudinal direction; holes provided in the rake-head wall and registering to said metal-band apertures; prongs passing through said holes and said apertures; means to put said metal-band under tension; a handle; a clip connected with said handle and embracing the said rake-head; and means to clamp this latter in said clip, for the purpose set forth.

In testimony whereof I affix my signature in presence of two witnesses.

MAX EDEL.

Witnesses:
 HANS ERMANN,
 KARL HOFFMANN.